United States Patent [19]

Mase

[11] 4,308,575
[45] Dec. 29, 1981

[54] POWER SOURCE SYSTEM

[75] Inventor: Akira Mase, Hino, Japan

[73] Assignee: Tokyo Shibaura Denki Kabushiki Kaisha, Kawasaki, Japan

[21] Appl. No.: 103,376

[22] Filed: Dec. 13, 1979

[30] Foreign Application Priority Data

Dec. 13, 1978 [JP] Japan ................................ 53-154027

[51] Int. Cl.³ ............................................. H02M 1/12
[52] U.S. Cl. ....................................... 363/48; 363/35; 363/37; 333/176; 307/105
[58] Field of Search ..................... 363/34, 35, 37, 39, 363/45–48, 51, 65, 68, 71; 307/3, 105; 333/175, 176, 177, 181

[56] References Cited

U.S. PATENT DOCUMENTS

| | | | |
|---|---|---|---|
| 3,825,814 | 7/1974 | Pelly | 363/48 X |
| 3,883,792 | 5/1975 | Ellert | 363/35 X |
| 3,935,551 | 1/1976 | Henniger et al. | 333/176 |
| 4,053,820 | 10/1977 | Peterson et al. | 363/48 X |

FOREIGN PATENT DOCUMENTS 51-107433 12/1976 Japan.

OTHER PUBLICATIONS

J. A. Baron, "Combined Primary-Tertiary AC Filters for HVDC Application", I.E.E. Conference on High Voltage DC and/or AC Power Transmission, 1973, London, England.

Primary Examiner—William M. Shoop
Assistant Examiner—Peter S. Wong
Attorney, Agent, or Firm—Oblon, Fisher, Spivak, McClelland & Maier

[57] ABSTRACT

A power source system, which comprises a converter for converting AC power on an AC bus into DC power, a damped filter connected between the AC bus and ground and including a capacitor and an inductor, a diode-rectifying circuit for taking out and rectifying fundamental and harmonic waves produced across the inductor in the damped filter and a circuit for connecting a DC output circuit in the diode-rectifying circuit in series with a DC output circuit in said converter, and in which the rectified output is regeneratively added to the output of the converter.

8 Claims, 7 Drawing Figures

F I G. 3
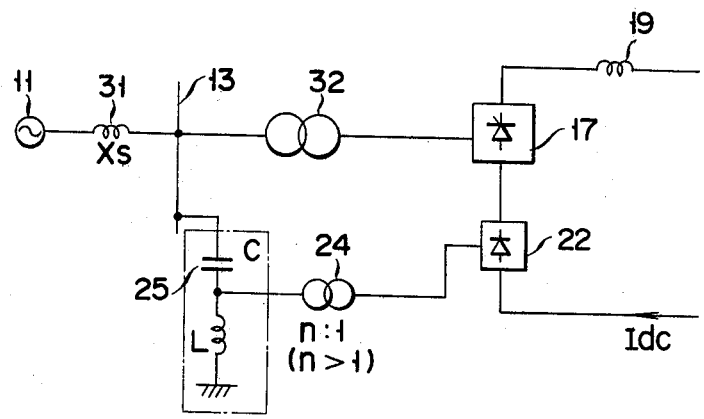
F I G. 4
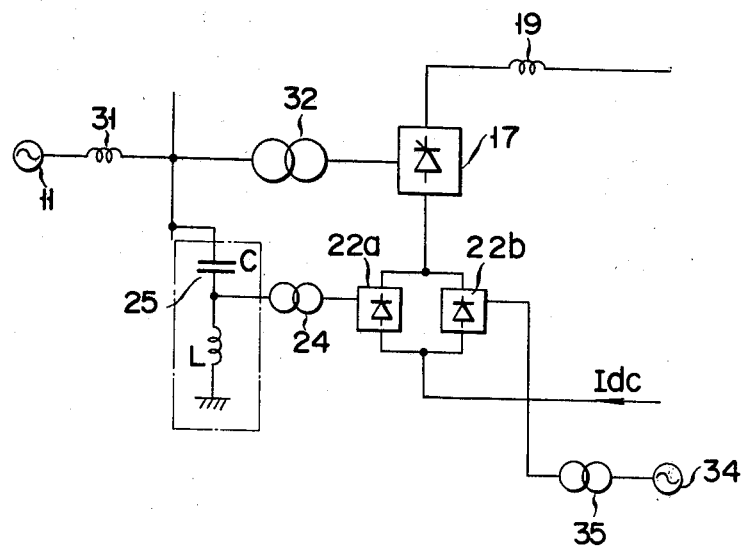

POWER SOURCE SYSTEM

BACKGROUND OF THE INVENTION

This invention relates to a power source system including a harmonic or damped filter for attenuating harmonic current generated on an AC bus and a power regenerating circuit adding fundamental and harmonic components of power generated by the action of the harmonic filter to the DC output circuit in a converter.

It has been well known in the art that harmonic current is generated on an AC bus, to which a cycloconverter, converter or the like is connected. This harmonic current has an adverse effects upon various power apparatus. For example, overloading or overheating of an apparatus due to harmonic current or the distorted voltage caused by a harmonic component is likely to occur.

It has been in practice to attenuate or suppress such harmonic current by connecting a harmonic filter on the AC bus. The harmonic filter usually consists of a combination of four tuned filters for attenuating respective 5th, 7th, 11th and 13th harmonics and a highpass filter for attenuating higher harmonics. The harmonic filter used to this end is not only bulky by itself but also requires a cooling equipment for its reactor and resistor. For example, when such a harmonic filter is employed in an HVDC power link, the required space amounts to more than 50% of that of the entire converter station.

A highpass filter has been used as damping filter whose characteristic frequency is generally chosen at a high harmonic order. Reduction of the above frequency leads to increase in a filter loss at fundamental frequency which is given as follows, concerning a conventional highpass filter.

$$I^2 R = (Q_{sc}/N_r^3)Q$$

where
$Q_{sc}$: reactive power rating
$Q$: quality factor
$N_r$: harmonic order

For example, under the condition $N_r=4$ and $Q=1.0$, the above filter loss amounts to as high as about 1.6% of the filter capacity. This means that filter rating $Q_{sc}=50$ MVar will produce a filter loss 800 KW. This is not practical for actual system in view of saving energy as well as requiring a large size cooling equipment.

SUMMARY OF THE INVENTION

An object of the invention is to provide a damping filter covering the whole harmonic frequency without increasing the orders ranging from high to low without at the expense of filter power loss.

The above object can be achieved by incorporating a regeneration circuit in place of a conventional resistor employed in a highpass filter.

BRIEF DESCRIPTION OF THE DRAWINGS

FIGS. 3 and 4 are schematic diagrams showing other embodiments of the invention.

DETAILED DESCRIPTION OF THE PREFERRED EMBODIMENTS

Figure 1:
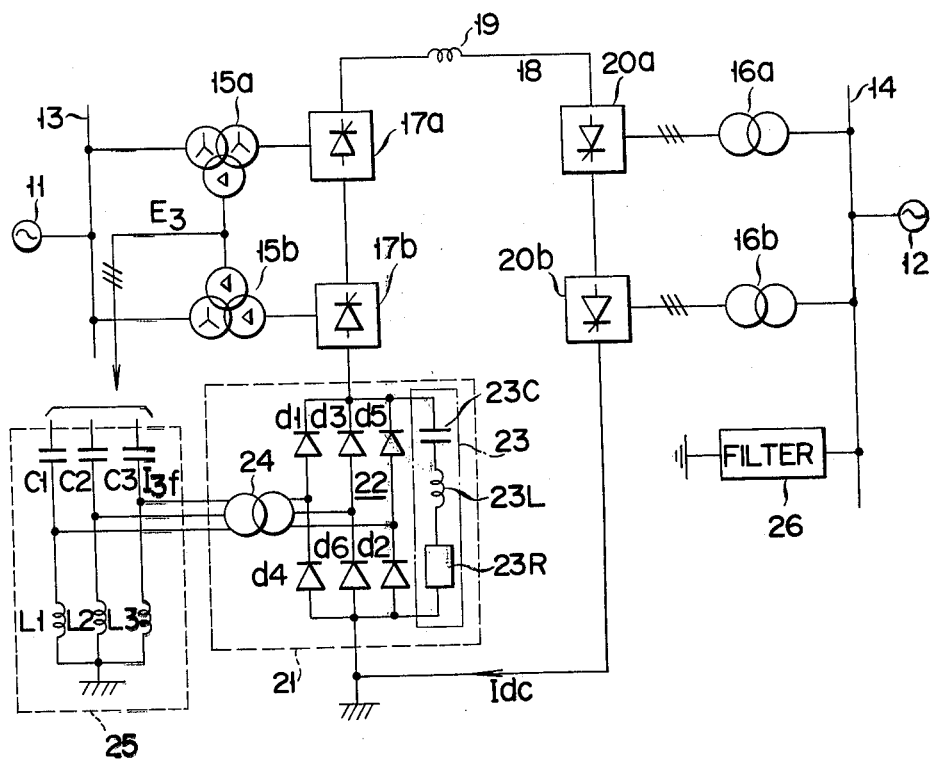
FIG. 1 is a schematic diagram showing an embodiment of the invention applied to an HVDC link.

FIG. 1 shows an embodiment of the invention applied to an HVDC link. Designated at 11 and 12 are three-phase AC power sources, to which primary windings of main transformers 15a, 15b and 16a, 16b are connected via respective three-phase AC buses 13 and 14. The main transformers 15a and 15b have their secondary windings connected to respective converters 17a and 17b to comprise 12-pulse connection. The converters 17a and 17b are connected in series on the DC side and the converter 17a is connected to the inverter side via DC reactor 19 and DC line 18. The inverters 20a and 20b are feeding AC power to the AC system 12 through the main transformers 16a and 16b. Transformers 15a and 15b have respective tertiary windings which are commonly connected to an external bus where the invented damping filter 25 is connected.

To describe the filter in detail, the portion concerned with the filter is shown in a three line diagram. Capacitances $C_1$, $C_2$, $C_3$ and inductors $L_1$, $L_2$, $L_3$ are constituting a three-phase circuit of the filter 25. Junction points between C and L feed the power regeneration circuit 21 via an auxiliary transformer 24. Diode-rectifying circuit 22 is inserted in series on the DC side of main converter 17b. The power regeneration circuit 21 also includes a DC filter 23 consisting of a capacitor 23C, an inductor 23L and a resistor 23R connected in series with one another. This DC filter 23 is used for smoothing out ripple components included in the output of the diode-rectifying circuit 22.

Another harmonic filter 26 is assumed to be of conventional type. Although the above description assumed the power flow from converters 17a, 17b to inverters 20a, 20b, it is allowed to be in either direction.

The operation of the embodiment shown in FIG. 1 will now be described. When the converters 17a, 17b, and the inverters 20a and 20b are inoperative, no harmonics are produced from these converters or inverters.

When the converters 17a and 17b are rendered operative in the above state, harmonic current is caused to flow in the bus 13. This harmonic current appears in tertiary windings of the main transformers 15a and 15b and is supplied to the harmonic filter 25. At this time, harmonic voltages are produced across the individual inductors $L_1$, $L_2$ and $L_3$ of the harmonic filter 25, and they are supplied through the auxiliary transformer 24 in the power regeneration circuit 21 to the diode-rectifying circuit 22 and rectified therein. As a result, a DC output in the form of a ripple is produced between the DC output terminals of the diode-rectifying circuit 22, and it is superimposed upon the current flowing through the DC line 18. This state means that the harmonic current in the harmonic filter 25 is absorbed in the power regeneration circuit 21 and that it is converted into DC power and regenerated on the DC line 18.

The DC component plus ripple voltage appearing on the output side of the diode-rectifying circuit 22 is increased in dependence upon the magnitude of the output current from the converters 17a and 17b. Therefore, although the output voltage $E_{df}$ of the diode-rectifying circuit 22 is $E_{df}>0$ when the output current $I_{dc}$ from the converters 17a and 17b is sufficiently low, with increase of the output current $I_{dc}$ a period of $E_{df}=0$ occurs as described below. When the output current $I_{dc}$ is increased beyond a certain value, there happens a case in which a lap angle during the commutation will exceed 60 degrees. In this case, the upper and lower arms of the diode-series circuit, for instance diodes $d_1$ and $d_4$, are obliged to simultaneously carry current, that is, the output of the diode-rectifying circuit 22 is shunted, and thus during this period $E_{df}=0$ occurs. When this state is brought about, the harmonic power is no longer regenerated since the diode-rectifying circuit 22 is in the DC shunted state. This DC shunted state, however, takes place only in an excessive overlap angle over 60 degrees and in an overall standpoint the function of the harmonic filter and regenerator are sufficiently fulfilled.

In order that the DC shunted state of the diode-rectifying circuit 22 may not take place, the output voltage $E_{df}$ should always meet the condition $E_{df}>0$. To achieve this, the maximum overlap angle for commutation may be set to 60° while setting the current limit $I_{df\text{-}max}$ of commutation of the diode-rectifying circuit 22 to be substantially equal to the maximum working current $I_{dc\text{-}max}$ through the converters 17a and 17b by approximately sizing the capacitors in the filter 25.

$$I_{df\text{-}max} = I_{dc\text{-}max} \tag{1}$$

Figure 2A:
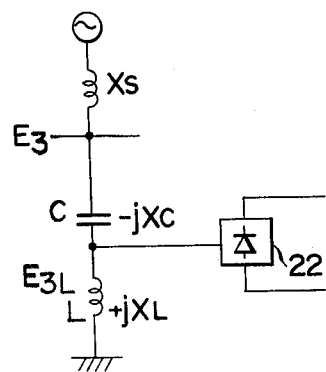
FIG. 2A is an equivalent circuit of a harmonic filter in the embodiment of FIG. 1.

While it is difficult to calculate the current limit $I_{df\text{-}max}$ of commutation since actually harmonics are superimposed upon the fundamental wave, the filter capacity $Q_{sc}$ and the required power capacity $P_{df}$ of the diode-rectifier 22 are obtained from the relation of equation (1) by considering only the fundamental wave in the following way.

Where the harmonic filter 25 is connected to the tertiary windings of the three-winding transformers 15a and 15b as shown in FIG. 1, the circuit may be represented by an equivalent circuit as shown in FIG. 2A. Here, $E_3$ represents the bus voltage of the tertiary windings of the transformers 15a and 15b, $X_S$ the overall reactance on the side of the AC power source 11 from the last mentioned juncture, C and L are respectively the capacitance value of the capacitors $C_1$, $C_2$ and $C_3$ and inductance value of the inductors $L_1$, $L_2$ and $L_3$, $-jX_C$ and $-jX_L$ are the reactances of the capacitance C and inductance L, and $E_{3L}$ the voltage at the junction between the capacitance C and inductance L. When the diode-rectifying circuit 22 is under no load, the input voltage $E_{3L}$ to the diode-rectifying circuit 22 is given as $$E_{3L} = \frac{E_3}{N_r^2 - 1} \tag{2}$$

where $N_r$ is $$N_r = \frac{f_r}{f_1} = \frac{1}{2\pi f_1 \sqrt{LC}}$$

and represents the harmonic order of the characteristic frequency of the filter 25 with respect to the fundamental frequency $f_1$.

Figure 2B:
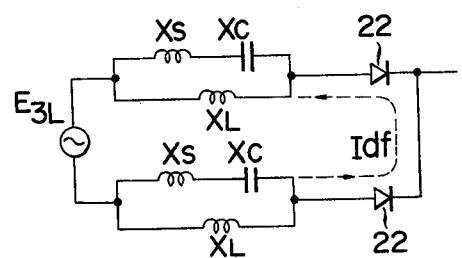
FIG. 2B is an equivalent circuit during commutation of a diode-rectifying circuit for regeneration shown in FIG. 1.

An equivalent circuit to the diode-rectifying circuit 22 in the commutating state is as shown in FIG. 2B from the Thevenin's Theorem. Here, the auxiliary transformer 24 is omitted. When it is assumed that the commutation voltage consists of the sole fundamental wave voltage, the commutation reactance can be practically regarded to be $X_L$ since $|X_C - X_S| \gg X_L$. Thus, the current $I_{df}$ caused through the diode-rectifying circuit 22 is $$I_{df} = \frac{E_{3L}}{\sqrt{2X_L}} \{\cos\alpha - \cos(\alpha + U)\} \tag{3}$$

Since the diode-rectifying circuit 22 consists of diodes, the control angle $\alpha$ in equation (3) is zero, and the overlap angle U at the limit of commutation is 60 degrees. Thus, denoting the reactive power capacity $Q_{sc}$ of the filter 25, from the relation $E_{3L}/X_L = Q_{sc}/E_3$ and equation (3) the commutation limit current $I_{df\text{-}max}$ of the diode-rectifying circuit 22 is given as $$I_{df\text{-}max} = \frac{Q_{sc}}{\sqrt{2E_3}}(1 - \cos 60°) = \frac{Q_{sc}}{2\sqrt{2E_3}} \tag{4}$$

If $Q_{sc}$ is 90 MVar and $E_3$ is 22 KV as sampled numerical values, from equation (3), $I_{df\text{-}max}$ is equal to 1.44 KA. Thus, by setting the maximum working current in the converters 17a and 17b to be lower than $I_{df\text{-}max}$, for instance $I_{dc}=1.2$ KA, the phenomenon of DC shunting does not occur in the diode-rectifying circuit 22.

Now, regenerated power supplied to the DC circuit 18 will be considered. The output voltage $E_{df}$ of the diode-rectifying circuit 22 is given as $$E_{df} = 1.35 E_{3L} \cdot \cos\alpha - \left(\frac{3}{\pi}\right) X_L \cdot I_{df} \tag{5}$$

Since the reactance $X_L$ is low, the value of the second term in the right side of equation (5) is small compared to that of the first term so that it can be omitted. Also, control angle $\alpha$ may be equal to zero by use of diode. From equations (4) and (5) the output $P_{df}$ of the diode-rectifying circuit 22 can be approximated as $$P_{df} = E_{df} \cdot I_{df} = (1.35 E_{3L}) \frac{Q_{sc}}{2\sqrt{2E_3}} \tag{6}$$

From equations (2) and (6) the ratio of the output $P_{df}$ of the diode-rectifying circuit 22 to the reactive power capacity $Q_{sc}$ of the filter 25 is $$\frac{P_{df}}{Q_{sc}} = \frac{1.35}{2\sqrt{2}}\left(\frac{1}{N_r^2 - 1}\right) \tag{7}$$

For example, if $N_r=4$, the value of the right side of equation (7) is about 1/30. If the filter capacity $Q_{sc}$ is 90 MVar, from equation (7) $P_{df}$ is 3 MW, which is the regenerated power. With converters 17a and 17b rated 300 MW, the regenerated power amounts of 1% of it.

The filter effects of the harmonic filter 25 combined with the power generating circuit 21 will now be discussed. Assuming $I_{df}$ is $I_{df\text{-}max}$, the impedance $R_{df}=E_{df}/I_{df}$ of the diode-rectifying circuit 22 looked from the input side thereof (corresponding to the resistance contained in the conventional highpass filter is roughly given as $$R_{df} = 1.35 E_{3L} \left( \frac{2\sqrt{2E_3}}{Q_{sc}} \right) \quad (8)$$

Usually, the sharpness or quality Q of a highpass filter is given as $$Q = \frac{N_r \cdot X_L}{R} \quad (9)$$

where $X_L = W_1 L = 2\pi f_1 L$, $f_1$ being the fundamental frequency. By substituting $R_{df}$ for R in equation (9) the sharpness Q of the diode-rectifying circuit 22 is $$Q = \frac{N_r \cdot X_L}{R_{df}} = \frac{(N_r \cdot X_L) Q_{sc}}{2.7 \sqrt{2E_3} \cdot E_{3L}} = \frac{N_r}{2.7 \sqrt{2}} \quad (10)$$

With $N_r = 4$, we obtain $Q \approx 1$ from equation (10). Under the conditions of, for instance, $Q_{sc} = 90$ MVar, $Q \approx 1.0$ and $N_r = 4$, on the 90 MVA basis we obtain $$X_L = \frac{X_c}{N_r^2} = \frac{1}{16} PU \quad (11)$$

and from equations (10) and (11) the impedance $R_{df}$ is 0.25 PU. This value coincides with the filter impedance $Z_f$ of the conventional highpass filter with a sharpness Q of 1.0, that is.

$$Z_f = R = N_r \cdot X_L = N_r \cdot \frac{X_c}{N_r^2} = \frac{X_c}{N_r}$$

Since $X_c$ is 1.0 PU on the basis of the filter capacity $Q_{sc}$, R is 0.25 PU with $N_r$ of 4.

Meanwhile, assuming the primary reactance $X_t$ of the transformers 15a and 15b 0.3 PU/180 MVA, the harmonic current division ratio between the AC power source 11 and filter 25 is determined as $R_{dt}/X_t$, and the smaller this ratio the better is the filter effect. The 5th- and 11th-harmonic impedances are sampled in Table 1 below. In the Table 1, effective value $X'_t$ is made equal to $X_t/2$ since the primary sides of the transformers 15a and 15b are connected in parallel as seen from the tertiary, and also the filter capacity $Q_{sc}$ is on the 90 MVA basis.

TABLE 1

| Harmonics | $R_{df}$(PU) | $X_t/2 = X_t'$ | Remarks |
|---|---|---|---|
| 5th | 0.25 | 0.15 × 5/2 = 0.375 | Transformers 15a and 15b |
| 11th | 0.25 | 0.15 × 11/2 = 0.825 | 0.3 PU/180 MVA per transformer |

With $Q_{sc}$ of 90 MVar the ratio $X'_t/R_{df}$ cannot be made sufficiently high, and by doubling the $Q_{sc}$ the filter impedance $R_{df}$ in the above Table 1 can be reduced to one half.

In this case, the regenerated power $P_{df}$ is also doubled as 3 MW×2 which amounts to 2% of sampled converter rating 300 MW. In either case of $Q_{sc} = 90$ MVar or $Q_{sc} = 90$ MVar×2, the current limit $I_{df\text{-}max}$ of commutation in the diode-rectifying circuit 22 is made to be the maximum working current ($I_{dc}$ being 100%) in the converters 17a and 17b, so that with partial load of $I_{dc} < 100\%$ the filter effect is degraded. For example, $I_{dc} = 50\%$ may double the filter impedance $R_{df}$ with the voltage $E_{df}$ remained unaltered and $I_{df}$ reduced to 50%. To cope with this problem, the winding ratio of the auxiliary transformer 24 may be set to 2:1 so that $I_{df}$ of 100% may be obtained with $I_{dc}$ of 50%. By so doing, the value of $R_{df}$ at $I_{dc} = 100\%$ can be maintained even at $I_{dc} = 50\%$. However, it should be noted that the total capacity $Q_{sc}$ thereof must always be in service.

In practice a filter capacity of 90 MVar×2 is considerably high with respect to a power rating of 300 MW of the converters 17a and 17b, so that from the practical standpoint it may be desirable to divide the harmonic filter 25 into four branches each having a capacity of 45 MVar, totalling 180 MVar, and thus permitting reduction of the number of working filter branches in case when the working current in the converters 17a and 17b is low. Doing so is also useful for the reactive power control. The harmonic filters used here are a damped filter for attenuating higher order harmonics, and thus switching operation of additional branch will not cause a heavy distortion on AC system voltage with some branches put in service.

As has been made apparent from the foregoing description, the conventional highpass filter has such a disadvantage that the resistance loss due to the fundamental frequency will be too large for practical solution at a lower harmonic order chosen as its characteristic frequency. Alternately, the preceding embodiment allows the filter power loss to be regenerated as well as providing an analogous filter function as the prior-art highpass filter. Briefly stating, the harmonic filter used in the preceding embodiment can be said to have satisfactory filter function and also be a lower harmonic frequency damping filter of less power loss.

The invention requires inevitably a large amount of reactive power for the filter 25 to make sure its filter effect. This problem can be solved in the following way. The actual power system employs lots of capacitor banks as a reactive power equipment, and such capacitors may also be used to construct the harmonic filter. The ordinary capacitor banks has a 6% series reactor, which means resonance frequency close to 4th harmonic order. Accordingly, the object of the invention may be achieved at less cost by merely combining this existing capacitor with the power regenerating circuit.

At present, 12-pulse operation is adopted as standard in HVDC links, and there is a trend of omitting both 5th and 7th harmonic filters. However, either energization of transformer or switching operation of capacitor banks may produce a severe voltage distortion on the AC bus which cause overvoltage in the AC system or commutation failure in an inverter operation. This is substantially affected by parallel resonance at a low harmonic frequency between large amount of capacitance employed in filter branches and AC system. The invented harmonic filter can work actively under the above transient states as well as steady state operation because of inherent damping filter at lower characteristic frequency.

Further embodiments of the invention will now be described. In the following embodiments the like parts as those in FIG. 1 are designated by the like reference numerals.

Referring to FIG. 3, which shows another embodiment of the invention, harmonic filter 25 is directly connected at AC bus 13. A two-winding transformer 32 is connected between the AC bus 13 and converter 17, and an AC reactor 31 for limiting the harmonic current to the AC system 11 is connected between the AC bus 13 and AC power source 11. Auxiliary transformer 24 functions to electrically insulate the AC side from DC side of the converter 17 as well as increasing the commutation current limit by changing its turn ratio in case when the working current in the converter 17 is high.

With the harmonic filter 25 connected to the primary side of the transformer 32 in the above way, the filter impedance $R_{df}$ is substantially equal to $1/N_r$ (PU) on the $Q_{sc}$ basis. Assuming the filter impedance $R_{df}$ two times the power rating $P_d$ of converter 17 and the reactance 0.2 PU for AC reactor 31 on the $Q_{sc}$ basis, the short-circuit capacity $S_K$ at AC bus 13 leads to $S_K/P_d = 10$ and the impedances of the harmonic filter and AC system are as shown in Table 2 on the $Q_{sc}$ basis.

TABLE 2

| Harmonics | $R_{df}$(PU) | $X_s$ (PU) | Remarks |
|---|---|---|---|
| 5th | 0.25 | 0.2 × 5 = 1.0 | |
| 11th | 0.25 | 0.2 × 11 = 2.2 | |

As is seen from Table 2 above, the harmonic filter in the embodiment of FIG. 3 can also have satisfactory filter function at higher harmonic order. This may be suited for industrial-purpose converters and the like having less converter capacity.

In case of the converter 17 is of low voltage and high current ratings, an intent of permitting commutation of the entire current on the converter side under the condition $E_{df}>0$, with $E_{df}$ being the output voltage of the diode-rectifying circuit 22 in the power regeneration circuit, is likely to make the required reactive power $Q_{sc}$ of the filter excessive. One measure of coping with this is shown in FIG. 4. Here, a separate diode-rectifying circuit 22b is connected in parallel with the diode-rectifying circuit 22a to share the output current $I_{dc}$ from the converter 17. A separate AC power source 34, supplies through a transformer 35 the diode rectifying circuit 22b whose output voltage is made substantially equal to the output voltage $E_{df}$ of the diode-rectifying circuit 22a for regeneration. In this way, the diode-rectifying circuit 22a can always be used within the current limit of commutation.

Figure 5:
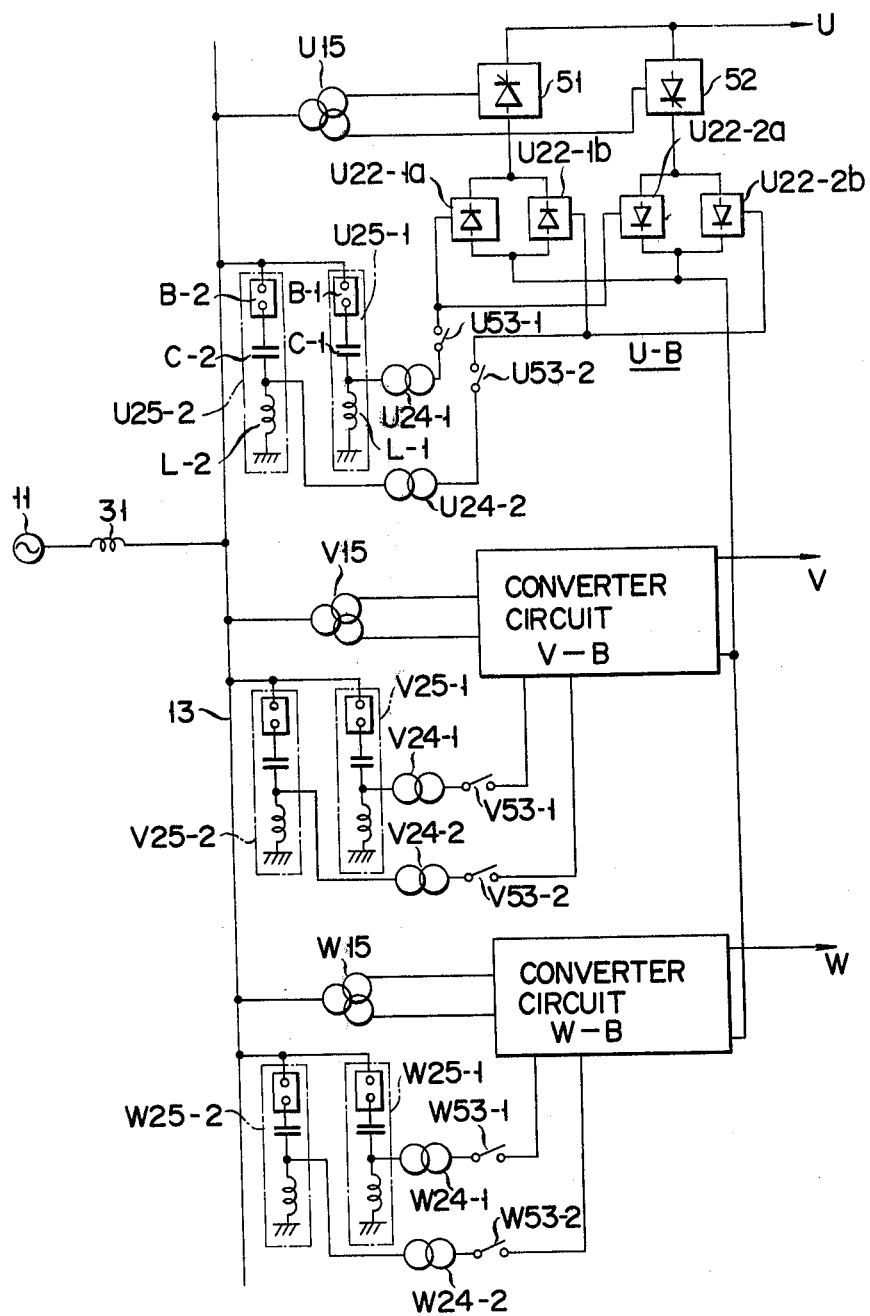
FIGS. 5 and 6 are schematics showing further embodiments of the invention applied to 6-pulse and 12-pulse cycloconverters, respectively.

FIG. 5 shows a further embodiment of the invention applied to a six-phase-connected cycloconverter. In FIG. 5, a U-phase three-winding transformer U15, the primary winding of which is connected to AC bus 13, has its first secondary winding connected to a positive converter 51 and its second secondary winding connected to a negative converter 52. A parallel circuit of diode-rectifying circuits U22-1a and U22-1b and a parallel circuit of diode-rectifying circuits U22-2a and U22-2b, respectively corresponding to the positive and negative converters, are connected in series with the respective output sides of the converters 51 and 52. The DC outputs of the converters 51 and 52 are commonly led to a U-phase output terminal U. The AC input terminals of the diode-rectifying circuits U22-1a and U22-2a are commonly connected through a switch U53-1 to the secondary side of an auxiliary transformer U24-1, the primary side of which is connected to the juncture between a capacitor C-1 and an inductor L-1 constituting a harmonic filter U25-1. The capacitor C-1 is connected through breaker B-1 to the AC bus 13. Similarly, the other diode-rectifying circuits U22-1b and U22-2b have their AC input terminals commonly connected through a switch U53-2 and an auxiliary transformer U24-2 to the juncture between a capacitor C-2 and an inductor L-2 constituting another harmonic filter U25-2. The capacitor C-2 is connected through a breaker B-2 to the AC bus 13. The diode-rectifying circuits U22-1a, U22-1b, U22-2a and U22-2b have their other output terminals commonly connected to the corresponding output terminals of V-phase and W-phase converter circuits V-B and W-B having the same construction as the U-phase converter circuit U-B. The harmonic filters U25-1, U25-2, V25-1, V25-2, W25-1 and W25-2 for U, V and W phases are to absorb the harmonic currents generated by the cycloconverter. Harmonic voltages produced across, for instance, the U-phase filter inductors L-1 and L-2 are supplied through the auxiliary transformers U24-1 and U24-2 to the diode-rectifying circuits U22-1a, U22-1b, U22-2a and U22-2b for regeneration. In this way, power regeneration for U-phase can be obtained. When the cycloconverter output currents are high, the switches U53-1, U53-2, V53-1, V53-2, W53-1 and W53-2 are closed to use both of the diode-rectifying circuits in the converter circuits U-B, V-B and W-B, while at reduced operating currents, only either one of the switches in each converter circuits U-B, V-B and W-B may be required to commutate the current.

Since the cycloconverter output current is AC current, there are two zero-current periods per cycle for each of the U, V and W phases where the filter effect is lost since the filter impedance $R_{df}$ may become infinity during this period. However, U, V and W phases are 120 degrees out of phase with one another and the same relation is valid for the zero current periods of the individual phases. Therefore, it is possible to avoid the reduction of the filter function during the zero current period by concurrently using harmonic filters for at least two of the U, V and W phases.

Considering such an aspect that harmonic order generated by a cycloconverter varies with its output frequency, the invention provides an advantage over a conventional tuned filter because it has filter effects upon all the higher harmonics than the characteristic frequency.

Figure 6:
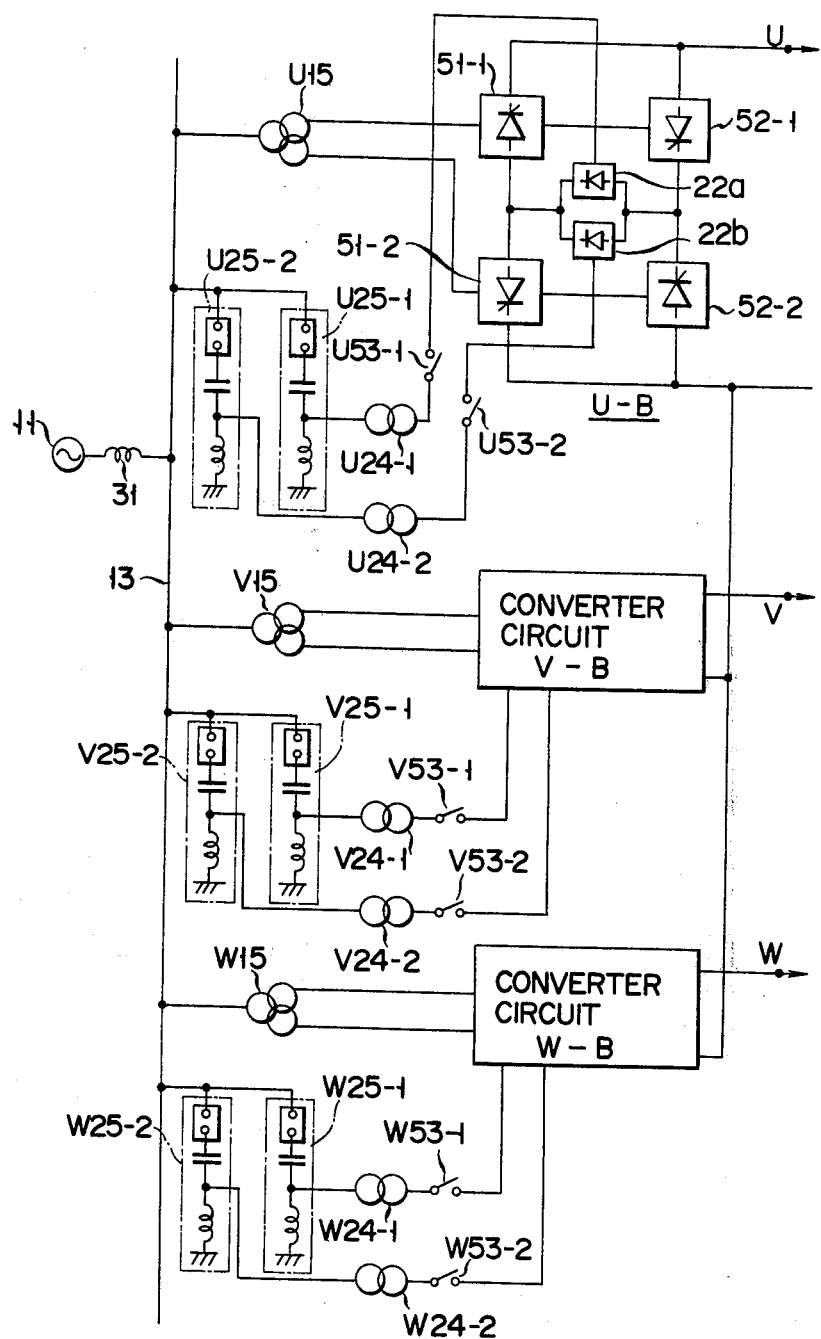

FIG. 6 shows a further embodiment of the invention applied to a 12-pulse cycloconverter. This is so called a 12-pulse H shaped connection. Conducting converters 51-1 and 52-2 carry positive current while converters 51-2 and 52-1 negative current. Therefore, there exists uni-direction current at the connection of diode-rectifying circuits 22a and 22b which are not required for positive and negative currents separately as described in FIG. 5.

Further, the invention can be applied as a harmonic filter for a reactive power compensator having thyristor switches where many odd harmonics are expected to be generated. Actual large size compensator will require many filter branches in case of conventional filter.

What is claimed is:
1. A power source system comprising a converter means for converting AC power on an AC bust connected to an AC power source into DC power, a damping filter means having a capacitor and an inductor connected in series between said AC bus and ground, means for taking out fundamental and harmonic currents produced by the action of said damped filter means from said damped filter means, and a power regeneration circuit means including a diode-rectifying circuit means for rectifying the fundamental and harmonic currents taken out by said take-out means and regeneratively adding the rectified current to a DC output side of said converter means.

2. The power source system according to claim 1, wherein said converter means includes first and second converters connected in series, said first converter having an AC input terminal thereof connected to a secondary side of a first main transformer having the primary side thereof connected to said AC bus, said second converter having an AC input terminal thereof connected to a secondary side of a second main transformer having the primary side thereof connected to said AC bus, said first and second main transformers having respective tertiary sides commonly connected to the input terminal of said damped filter means.

3. The power source system according to claim 1, wherein said diode-rectifying circuit means included in said power regeneration circuit means include diodes and a filter circuit in parallel with said diode-rectifying circuit.

4. The power source system according to claim 3, wherein said means for taking out fundamental and harmonic currents from said damped filter means includes an auxiliary transformer having the primary side connected to the juncture between the capacitor and inductor in said damped filter means, the secondary side of said auxiliary transformer being connected to an AC input terminal of said diode-rectifying circuit in said power regenerating circuit means.

5. The power source system according to claim 1, which further comprises an AC reactor provided between said AC power source and said AC bus, and also in which said damped filter means have an input terminal connected to said AC bus.

6. The power source system according to claim 5, wherein said power regenerating circuit means includes first and second parallel diode-rectifying circuits having respective output terminals connected to the output side of said converter means, said first diode-rectifying circuit having an AC input terminal connected through a first auxiliary transformer to the juncture between the capacitor and inductor of said damped filter means, said second diode-rectifying circuit having an AC input terminal connected through a second auxiliary transformer to another AC power source, the output voltage of said second auxiliary transformer being substantially equal to the output voltage of said first diode-rectifying circuit at the time of the current limit of commutation thereof.

7. The power source system according to claim 1, wherein said converter means includes first, second and third converter circuits constituting a 6-pulse cycloconverter, each said converter circuit having a three-winding transformer with the primary side thereof connected to said AC bus, anti-parallel connected positive and negative converters having respective AC input terminals respectively connected to the first and second secondary sides of said three-winding transformer, a first diode-rectifying circuit connected in series with said positive converter, and a second diode-rectifying circuit connected in series with said negative converter; and wherein said damped filter means including first and second parallel filter circuits each connected at one end to said AC bus at the other end to ground and each consisting of a capacitor and an inductor in series with each other; and wherein said current take-out means includes a first auxiliary transformer having the primary side thereof connected to the juncture between the capacitor and inductor in said first filter, and the secondary side of said first auxiliary transformer being connected through a first switch to the AC input terminals of both said positive and negative diode-rectifying circuits.

8. The power source system according to claim 1, wherein said converter means includes first, second and third converter circuits constituting a 12-pulse cycloconverter, each said converter circuit having a three-winding transformer, first and second converters of opposite polarities and having respective AC input terminals commonly connected to the first secondary side of said three-winding transformer, third and fourth converters of opposite polarities and having respective AC input terminals commonly connected to the second secondary side of said three-winding transformer, and first and second diode-rectifying circuits each having one of the DC output terminals connected to one of the output terminals of each of said first and third converters, the other DC output terminal of each said diode-rectifying circuit being connected to one of the output terminals of each of said second and fourth converters;

wherein said damped filter means have first and second parallel filters each connected at one end to said AC bus and at the other end to ground and each consisting of a capacitor and an inductor; and wherein said current take-out means have a first auxiliary transformer the primary side thereof connected to the juncture between the capacitor and inductor in said first filter, the secondary side of said auxiliary transformer being connected through a first switch to the AC input terminal of said first diode-rectifying circuit, and a second auxiliary transformer with the primary side thereof connected to the juncture between the capacitor and inductor in said second filter, the secondary side of said second auxiliary transformer being connected through a second switch to the AC input terminal of said second diode-rectifying circuit.

* * * * *